June 28, 1932.  L. M. HOLCOMB  1,865,372
PRUNE HARVESTER
Filed Dec. 14, 1931   2 Sheets-Sheet 1
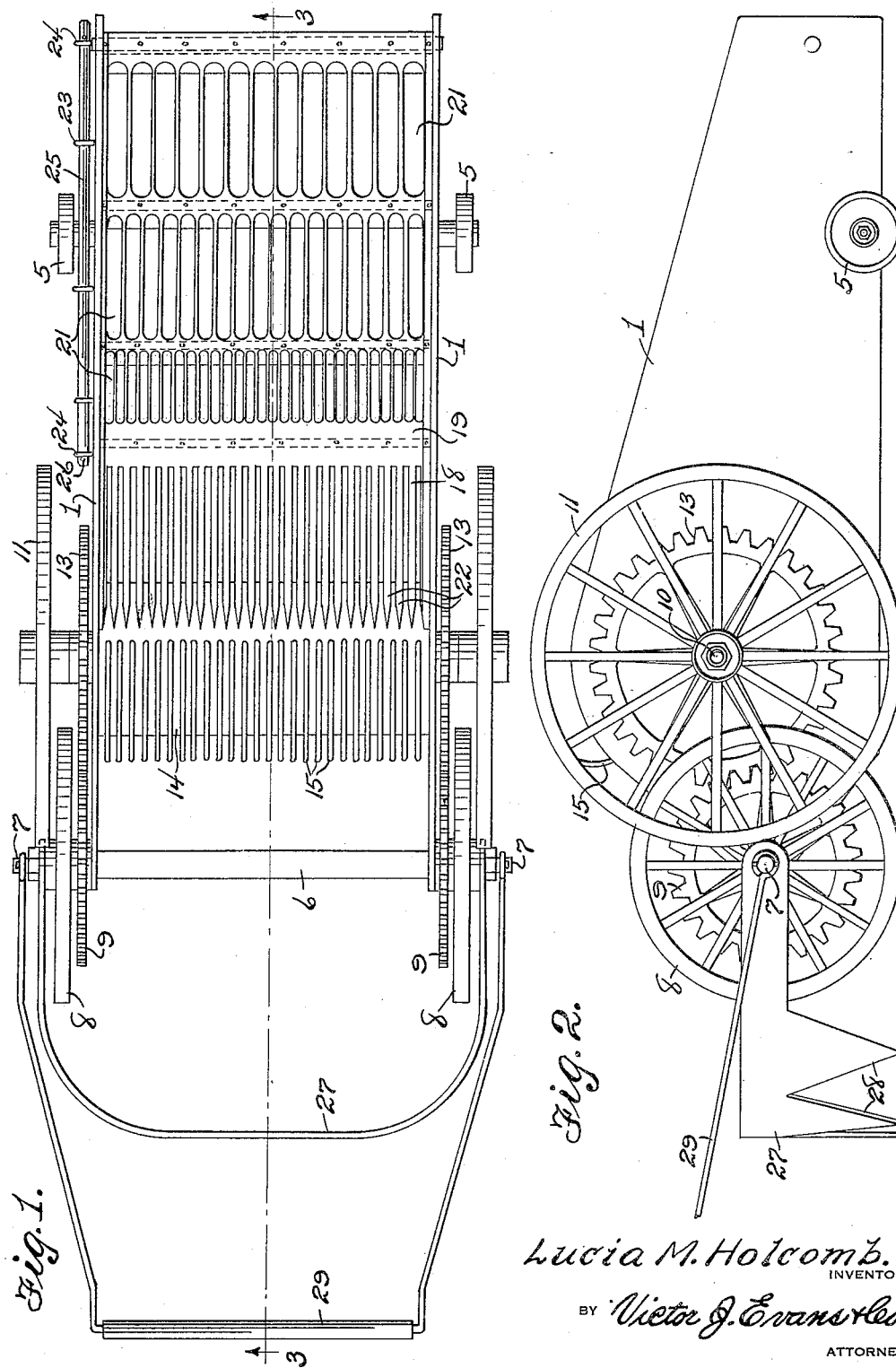
Lucia M. Holcomb.
INVENTOR
BY Victor J. Evans & Co.
ATTORNEY June 28, 1932.  L. M. HOLCOMB  1,865,372
PRUNE HARVESTER
Filed Dec. 14, 1931  2 Sheets-Sheet 2
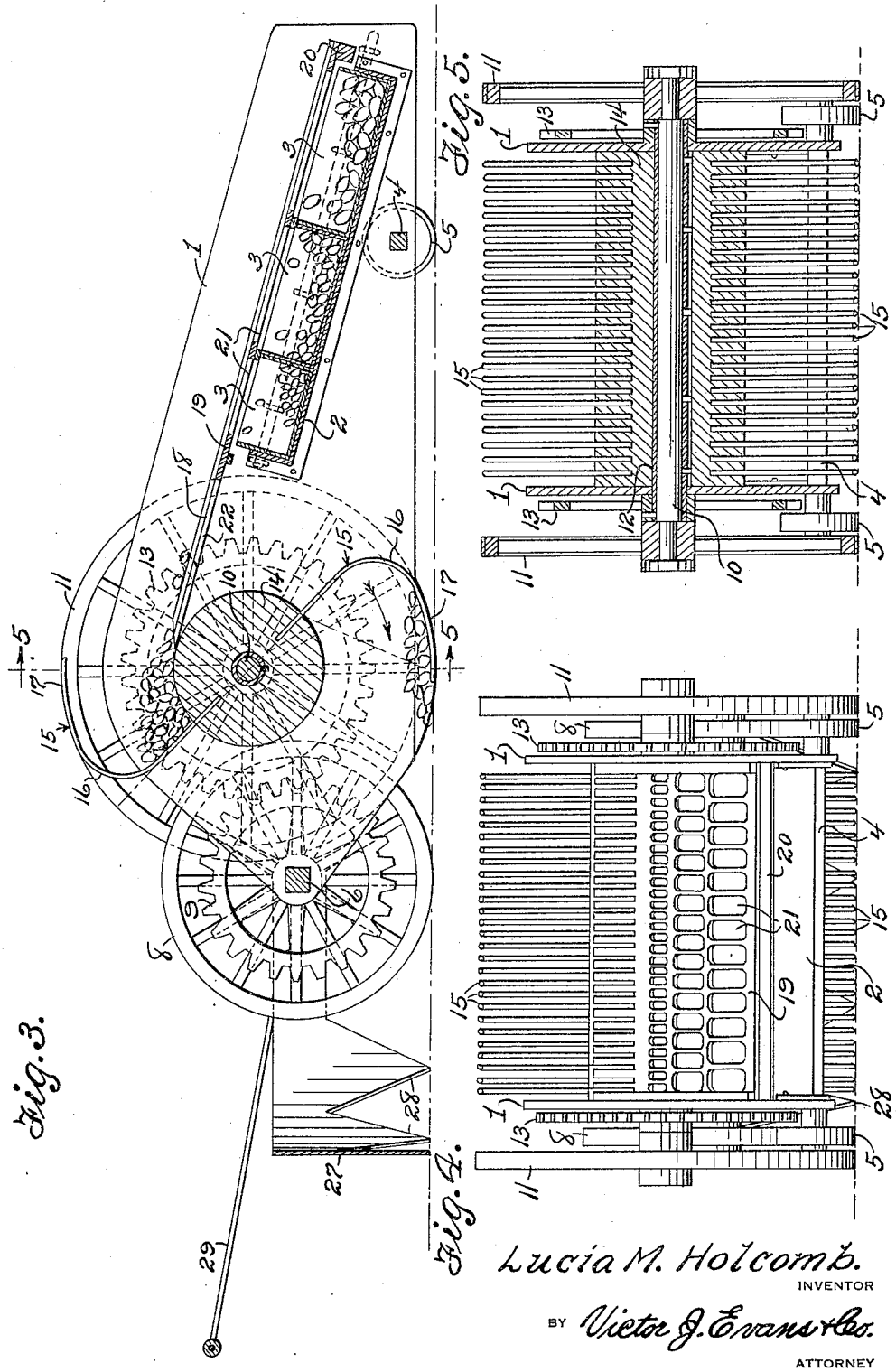
Lucia M. Holcomb.
INVENTOR
BY Victor J. Evans & Co.
ATTORNEY Patented June 28, 1932

1,865,372

UNITED STATES PATENT OFFICE

LUCIA M. HOLCOMB, OF SAN JOSE, CALIFORNIA

PRUNE HARVESTER

Application filed December 14, 1931. Serial No. 580,959.

My present invention has reference to a prune harvester of a construction whereby the same is manually drawn over the orchard and which will harvest the prunes by elevating the same from the ground and depositing the prunes onto a grader which delivers the different sizes of prunes into trays provided for this purpose, and whereby the orchard may be quickly harvested and the prunes sorted in a sanitary manner, that is, without handling of the prunes by the operator.

A further object is the provision of a combined prune harvester and sorter or grader which is characterized by simplicity in construction and reliability and efficiency in practical use.

To the attainment of the foregoing the invention consists in the improvement hereinafter described and definitely claimed.

In the drawings:

Figure 1 is a plan view of the invention.

Figure 2 is a side elevation thereof.

Figure 3 is a sectional view approximately on the line 3—3 of Figure 1.

Figure 4 is a rear end view of the device.

Figure 5 is a sectional view approximately on the line 5—5 of Figure 3.

As disclosed by the drawings I provide an open body, that is, a body constructed to comprise parallel sides 1 and if desired a rear end. Secured to and spacing the sides there are the flanged ends and lower edge of a box-like member 2, and this member affords a receptacle for any desired number of removable trays 3—3. The rear of the frame or body has its sides also spaced by an axle 4 whose spindles extend through the said sides and have journaled thereon small wheels or rollers 5.

The top of the open body has its upper edge inclined from adjacent its front to its rear and the box-like member 2 is supported at an angle corresponding to that of the said upper edges of the sides or bottom. The forward or front end of the sides of the body have their edges rounded or inclined toward each other at the front thereof and receive therethrough a cross sectionally squared axle 6 provided with spindles 7 on which are journaled ground wheels 8 and on the inner face or on the hub of each ground wheel there is fixed a gear 9.

To the rear above the axle 6 there is journaled through the sides of the open body a cross sectionally round shaft 10 on whose spindle ends there are journaled ground wheels 11 larger than the front ground wheels 8. On the round shaft 10 there is a loose sleeve 12 whose ends pass through bearing openings in the sides of the body and on whose projecting ends there are fixed the hubs of gear wheels 13 which are in mesh with the gears 9. The tubular member or sleeve 12, between the sides of the body has fixed thereon a drum or barrel 14 which is in the nature of a solid member but which is provided with longitudinally arranged series of equidistantly spaced openings affording sockets for the inner ends of spring tines 15. The tines are rounded, as at 16, so that their outer ends are arched, as at 17, and these arched ends do not project beyond the periphery of the wheels 11.

By providing the pairs of ground wheels 8 and 11, together with the rollers 5, the body is firmly supported for movement around the orchard, and further by providing the fixed gears 9 and the wheels 8 and the loose or freely journaled gears 13 and the shaft for the wheels 11 the tine carrying drum will be caused to rotate in the direction of the arrow in Figure 3 of the drawings, and whereby the prunes gathered by the tines will be elevated and deposited on to the forward portion 18 of a grading plate 19. The plate is supported on suitable wings 20 between the sides of the body and directly above the trays 3. The plate 19 is provided with series of longitudinally extending openings 21 respectively, and these openings vary in length. In this connection it should be stated that the trays 3 also vary in length to correspond with the transverse series of openings 21 thereabove, so that prunes of different sizes sliding or gravitating over the grader plate will drop through the proper openings into the proper trays. Also by reference to the drawings it will be noted that the forward end 18 of the grader plate 19 comprises closely related fingers 22 arranged to receive the tines there-between and whereby any dirt or dust accumulating on the prunes will fall between the fingers and the said prunes moved by gravity over the grader plate.

One of the sides is provided with one or more openings arranged directly opposite the trays 3, and the outer sides of these trays close the opening or openings. These sides of the trays are each provided with a bail-like handle 23 and the said side of the open body has fixed thereon eye members 24 and the eye members and handles 23 are designed to have passed therethrough a locking element in the nature of a rod 25 which may have its end adjacent the forward portion of the harvester offset or which may be held from movement by cotter or like pins 26 which contact with the outer faces of the eyes 24. A suitable transverse cleat affords a barrier for the prunes should the same gravitate beyond the lower and larger openings in the grader plate.

There is pivotally connected to the spindles 7 on the axle 6 the ends of a rake member 27 which is arched in plan and which is formed with depending substantially V-shaped teeth 28. These teeth are so spaced as to permit of the rake removing twigs, leaves, grass or other obstructions from the prunes to be harvested, directing such obstructions to one side of the machine while also pivotally secured and held from outward movement on the said spindles 7 there are the inclined sides of a bail-like handle 29 by which the machine is drawn over the orchard.

It is believed that the foregoing description, when read in connection with the drawings will fully and clearly set forth my construction and its advantages, and while I have illustrated a satisfactory embodiment of my improved device my features of invention are capable of extended application and I do not wish to be limited to the specific construction herein shown and described.

Having described the invention, I claim:

1. A prune harvester and grader, including a frame comprising spaced side members and front and rear ground wheels supporting the frame, a box-like member arranged at a downward angle between the side members, and serving as a support for trays, one of the sides having openings in a line with the trays, means for removably holding the trays in the box-like member, a grader plate having transverse series of different size openings supported at an angle above the respective series of trays, and said plate having one of its ends formed with spaced fingers, a drum, transverse series of equidistantly spaced tines having outwardly arched ends and their inner ends secured to the drum, and said tines being movable between the fingers when the drum is rotated, and means actuated by the turning of the front ground wheels for revolving the drum.

2. A prune harvester and grader, including a frame comprising spaced side members and front and rear ground wheels supporting the frame, a box-like member arranged at a downward angle between the side members and serving as a support for trays, one of the sides having openings in a line with the trays, means for removably holding the trays in the box-like member, a grader plate having transverse series of different size openings supported at an angle above the respective series of trays, and said plate having one of its ends formed with spaced fingers, a drum, transverse series of equidistantly spaced tines having outwardly arched ends and their inner ends secured to the drum, and said tines being movable between the fingers when the drum is rotated, means actuated by the turning of the front wheels for revolving the drum, a bail-like handle pivotally secured to the front of the harvester and an arched rake having its ends pivotally secured to the harvester and having depending substantially V-shaped teeth.

3. A prune harvester and grader including a body member that comprises spaced side plates, ground engaging rollers supporting the rear of the body, a box-like member arranged at a downward inclination in the body, and secured to the sides thereof, said box and one of the sides of the body having alining openings, a series of trays received in the box and closing the openings in the side of the body, removable means for latching the trays in the box-like member, a grader plate supported at an inclination in the body above the trays and having longitudinally arranged transversely disposed series of different sized openings therethrough, which are disposed above the respective trays, the forward end of the plate being provided with spaced fingers, a cross sectionally round shaft journaled through the sides of the body below the outer ends of the fingers, and ground engaging wheels journaled on said shaft, a sleeve member on the shaft, a drum centrally fixed on the sleeve member, transversely arranged spaced series of tines carried by the drum and having their outer ends arched and said tines being movable between the fingers when the drum is rotated, gear wheels fixed on the outer ends of the sleeve, an axle between the sides of the body at the forward end thereof and having spindle extensions, ground wheels journaled on said spindles, gears fixed on the hubs of the wheels and in mesh with the first-named gears, an arched rake having its ends journaled on the spindles provided with V-shaped teeth and a handle having a bail which is also journaled on the spindles.

In testimony whereof I affix my signature.

LUCIA M. HOLCOMB.